United States Patent
Ghodke et al.

(10) Patent No.: US 12,050,528 B2
(45) Date of Patent: Jul. 30, 2024

(54) SYSTEM, METHOD, AND COMPUTER PROGRAM FOR DEVELOPMENT DRIVEN TEST AUTOMATION

(71) Applicant: Amdocs Development Limited, Limassol (CY)

(72) Inventors: Jinendra Ghodke, Pune (IN); Arvind Ghodse, Nanded (IN); Prateek Vyas, Jodhpur (IN); Ravi Kumar, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 71 days.

(21) Appl. No.: 17/732,327

(22) Filed: Apr. 28, 2022

(65) Prior Publication Data

US 2023/0350792 A1    Nov. 2, 2023

(51) Int. Cl.
| | | |
|---|---|---|
| G06F 11/36 | (2006.01) | |
| G06F 8/10  | (2018.01) | |
| G06F 8/33  | (2018.01) | |
| G06F 9/54  | (2006.01) | |

(52) U.S. Cl.
CPC ...... *G06F 11/3688* (2013.01); *G06F 11/3672* (2013.01); *G06F 11/3684* (2013.01); *G06F 11/3692* (2013.01); *G06F 2201/865* (2013.01)

(58) Field of Classification Search
CPC .......... G06F 11/3688; G06F 11/3684; G06F 11/3692; G06F 11/3672; G06F 2201/865
See application file for complete search history.

(56) References Cited

U.S. PATENT DOCUMENTS

| | | | |
|---|---|---|---|
| 9,606,900 B1 | 3/2017 | Pradhan et al. | |
| 10,073,763 B1* | 9/2018 | Raman | G01R 31/31835 |
| 10,332,073 B2* | 6/2019 | Abebe | G06Q 10/103 |
| 10,810,110 B1* | 10/2020 | Thomas | G06F 11/3664 |
| 11,340,871 B1* | 5/2022 | Masis | G06F 8/33 |
| 2013/0152047 A1* | 6/2013 | Moorthi | G06F 11/3664 717/124 |
| 2016/0283353 A1* | 9/2016 | Owen | G06F 11/3684 |
| 2017/0185509 A1* | 6/2017 | Arkadyev | G06F 11/3696 |
| 2018/0011780 A1* | 1/2018 | Aggarwal | G06F 11/36 |
| 2018/0267888 A1* | 9/2018 | Shani | G06F 8/71 |
| 2020/0104241 A1* | 4/2020 | Talukdar | G06F 11/3684 |
| 2020/0387372 A1* | 12/2020 | Venugopal Kalavathy | G06F 9/54 |
| 2021/0232494 A1* | 7/2021 | Chatterjee | G06F 11/3684 |
| 2022/0100643 A1* | 3/2022 | Storck | G06F 11/3664 |
| 2022/0147438 A1* | 5/2022 | Gadagi | G06F 9/45558 |
| 2022/0350733 A1* | 11/2022 | Vasavan | G06F 11/3692 |

OTHER PUBLICATIONS

Mathias Landhauber et al., Connecting User Stories and Code for Test Development, Mar. 2012, [Retrieved on Mar. 22, 2024]. Retrieved from the internet: <URL: https://ps.ipd.kit.edu/downloads/ka_2012_connecting_user_stories.pdf> 5 Pages (1-5) (Year: 2012).*

(Continued)

*Primary Examiner* — Anibal Rivera
(74) *Attorney, Agent, or Firm* — Zilka-Kotab, P.C.

(57) ABSTRACT

A system, method, and computer program are provided for development driven test automation. Annotations are received for an application during development of the application. The annotations are processed to generate a test automation for the application.

18 Claims, 5 Drawing Sheets

(56) References Cited

OTHER PUBLICATIONS

Partial International Search Report and Written Opinion from PCT Application No. PCT/IB2023/054155, dated Jul. 17, 2023.
Korel et al., "Assertion-oriented automated test data generation," Proceedings of the IEEE 18th International Conference on Software Engineering, 1996, pp. 71-80.
International Search Report and Written Opinion from PCT Application No. PCT/IB2023/054155, dated Sep. 6, 2023.

* cited by examiner

SYSTEM, METHOD, AND COMPUTER PROGRAM FOR DEVELOPMENT DRIVEN TEST AUTOMATION

FIELD OF THE INVENTION

The present invention relates to automated testing for computer programs.

BACKGROUND

Automated testing, or test automation, is integral to software application development. Automated testing refers to one or more test that are executed in an automated manner to verify correct operation of an application. Automated testing can verify the operation of user interfaces and/or underlying functionality. Software application development relies on automated testing to ensure correctness of the software before the software is deployed for use (e.g. by end users or other systems).

To this end, test automation is highly dependent on application development progress and automation maintenance is extremely high since it is tightly coupled with application changes. However, test automation is typically managed by designated testing teams without the involvement of the software application developers. This decoupling of test automation from application development results in inefficient test automation development since such test automation development can only occur after application development is complete.

There is thus a need for addressing these and/or other issues associated with the prior art. For example, there is a need to provide development driven test automation.

SUMMARY

As described herein, a system, method, and computer program are provided for development driven test automation. Annotations are received for an application during development of the application. The annotations are processed to generate a test automation for the application.

DETAILED DESCRIPTION

Figure 1:
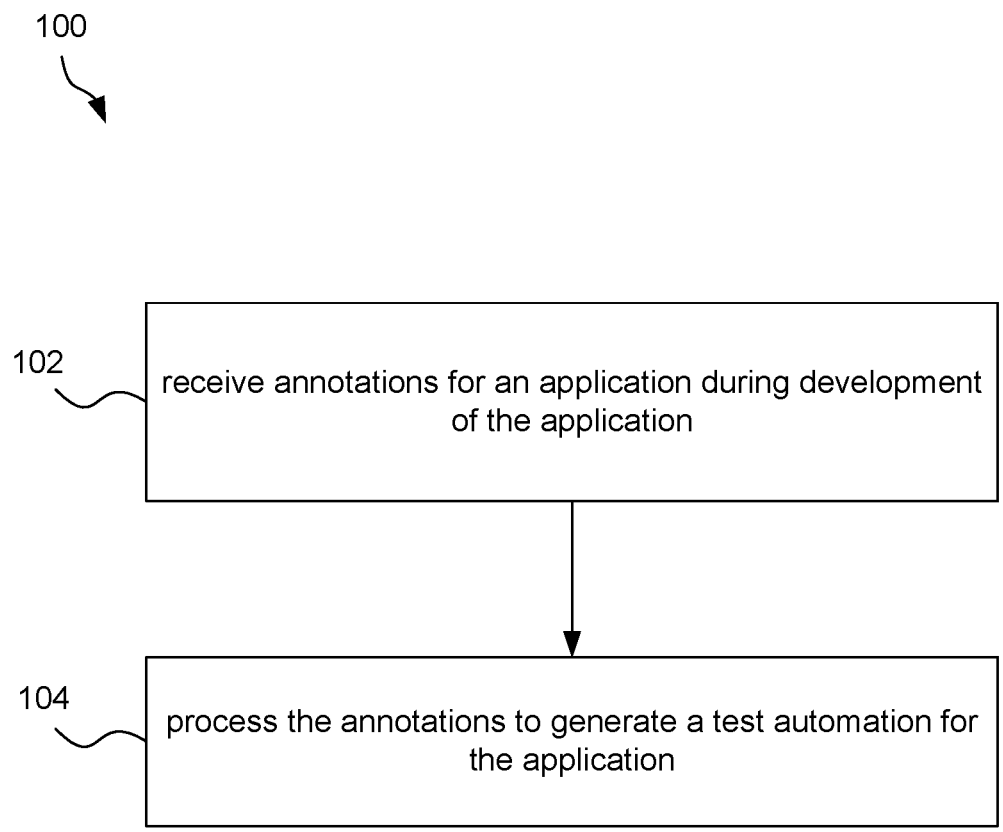
FIG. 1 illustrates a method for development driven test automation, in accordance with one embodiment.

FIG. 1 illustrates a method 100 for development driven test automation, in accordance with one embodiment. The method 100 may be performed by any computer system(s) described below with respect to FIGS. 4 and/or 5. In one example described herein, the method 100 may be performed by a computer system used for managing test automation for an application.

In operation 102, annotations are received for an application during development of the application. The application refers to any computer program that is configured to perform one or more specific functions for an end user or another application. For example, the application may include a plurality of features such as user interfaces, functions, libraries, application programming interfaces (APIs), etc.

Development of the application refers to any stage of the creation of one or more portions (e.g. features, code blocks, etc.) of the application by developers. In an embodiment, the development of the application may include development of an initial version of the application. In another embodiment, the development of the application may include development of an update to an existing version of the application.

The annotations that are received for the application during the development of the application refer to any data provided in association with the application that is capable of being used to generate a test automation for the application. For example, the annotations may define features of the application. In an embodiment, the annotations may be selected for the application during development thereof from a library of available (predefined) annotations.

The annotations may be tagged, linked, etc. to the various features of the application, or otherwise associated with the application in any desired manner. In one embodiment, the annotations may be manually input by developers of the application during the development of the application. In this case, the annotations may be received via a user interface which may be provided as part of a developer interface used by the developers to develop the application. Just by way of example, the user interface may connect with the library of available annotations mentioned above to allow the developers to select annotations for the application from the library. Of course, the annotations may also be defined (e.g. by the developers) in a document separate from the application.

In operation 104, the annotations are processed to generate a test automation for the application. The test automation refers to an automated test that is capable of being executed to test one or more portions of the application that have been developed. The test automation may be configured for execution by a test automation system separate from the developer interface mentioned above.

In one embodiment, the processing of the annotations may be triggered by a predetermined event. In other words, when the predetermined event is detected, the annotations may be processed to generate the test automation. The predetermined event may include developers of the application submitting (or otherwise indication completion of) at least one developed portion of the application, in which case the at least one developed portion includes the annotations.

Processing the annotations may include performing any defined process that uses the annotations to generate the test automation. In one embodiment, the annotations may be processed by creating a Behavioral Driven Development (BDD) feature file for the application, utilizing the annotations. With respect to this embodiment, the BDD feature file may be created by applying natural language processing (NLP) to the annotations. To this end, the test automation may be generated from the BDD feature file, such as by using artificial intelligence (AI)-driven automation to covert the BDD feature file to the test automation.

While not shown in the present method 100, it should be noted that once the test automation is generated, the test automation may be executed for the application. The test automation may be executed to test the application for errors (e.g. design errors). Results of the execution of the test automation may then be reported (e.g. output), for example to the developers of the application. In this way, the method 100 may be performed to provide test automation that can be automatically driven by the development of the application via the use of the annotations provided during the development of the application.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
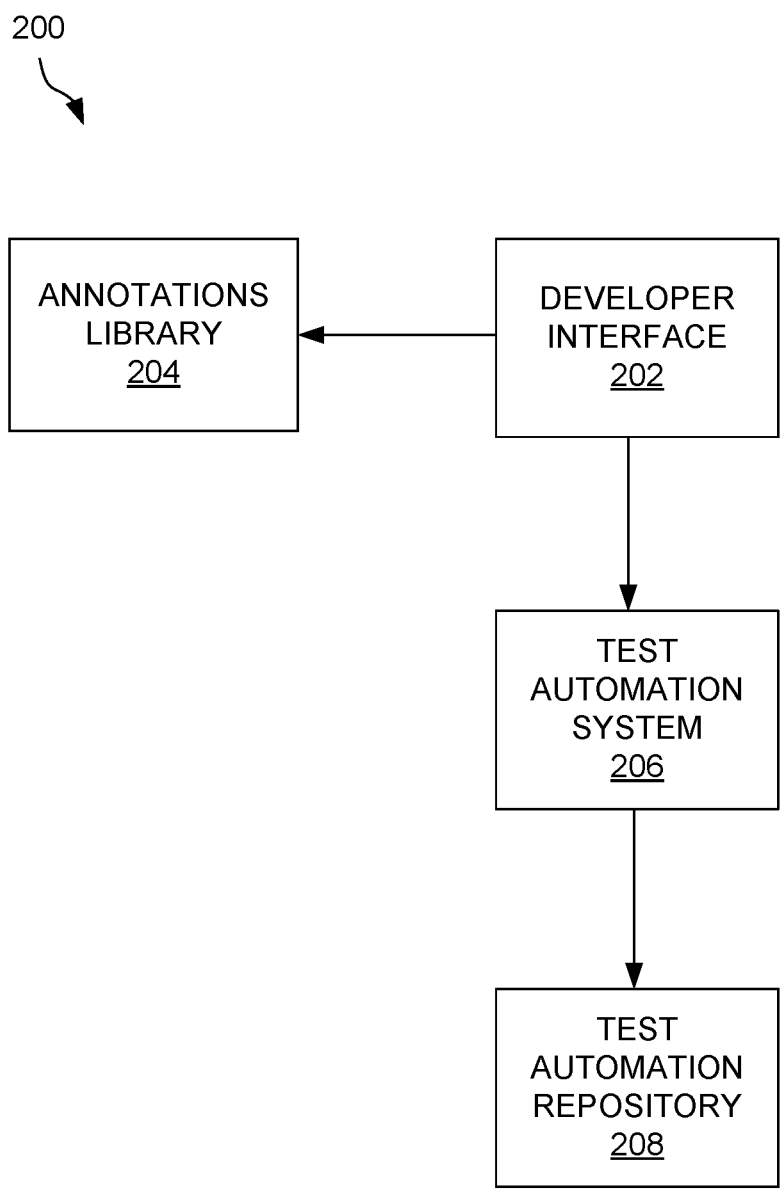
FIG. 2 illustrates a flow diagram of a system for development driven test automation, in accordance with one embodiment.

FIG. 2 illustrates a flow diagram of a system 200 for development driven test automation, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a developer interface 204 is included in the system 200 which provides one or more user interfaces and underlying functionality to developers for use in developing applications. An annotations library 202 is also included in the system 200 which stores annotations that are available for use in annotating applications, that in turn can be used to generate a test automation for the applications. The developer interface 204 provides access to the annotations library 202 for use by the developers in annotating an application during development thereof.

A test automation system 206 is included in the system 200 which is configured to generate, and in some embodiments execute, test automations for the applications developed and annotated via the developer interface 204. The developer interface 204 is in communication with the test automation system 206 to provide the annotated application to the test automation system 206 (e.g. upon occurrence of a predetermined triggering event). Upon receipt of the annotated application, the test automation system 206 processes the annotations to generate the test automation for the application.

The test automation system 206 can store any generated test automations in a test automation repository 208. The test automation system 206 can automatically execute the test automation upon generation thereof, or can execute the test automation on-demand from the test automation repository 208. Results of the execution of the test automation may be provided back to the developer interface 204 for presentation to the developers, in one embodiment.

Figure 3:
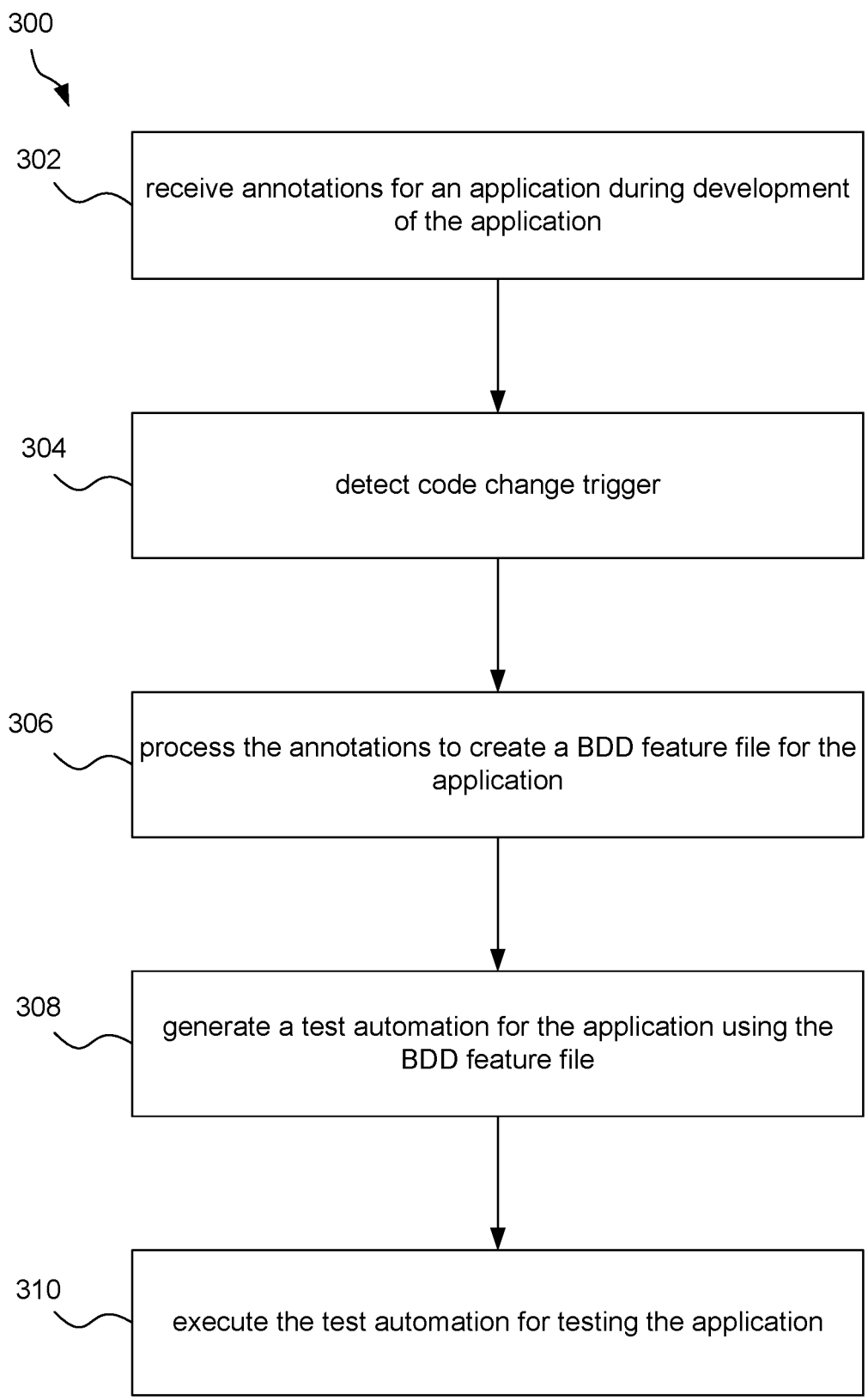
FIG. 3 illustrates a method for creating a test automation in parallel with development of the application, in accordance with one embodiment.

FIG. 3 illustrates a method 300 for creating a test automation in parallel with development of the application, in accordance with one embodiment. As an option, the method 300 may be carried out in the context of the details of the previous figure and/or any subsequent figure(s). For example, the method 300 may be carried out by the test automation system 200 of FIG. 2. Of course, however, the method 300 may be carried out in the context of any desired environment. Further, the aforementioned definitions may equally apply to the description below.

In operation 302, annotations are received for an application during development of the application. In operation 304, a code change trigger is detected. The code change trigger is a predefined event indicating that code of the application has been developed, such as by virtue of an update submitted for the application by a developer.

In operation 306, the annotations are processed to create a BDD feature file for the application. In operation 308, a test automation is created for the application using the BDD feature file. In operation 310, the test automation is executed for testing the application.

It should be noted that the method 300 described herein may be performed for each development submission provided by the developers of the application. Thus, the test automation for one development submission may be generated (and optionally executed) in parallel with the on-going development of another portion of the application. This may enable shorter delivery cycles for tested applications, including application updates, resulting in faster time to market. This may also enable shared responsibility of the test automation process as the developers, with the greatest knowledge of the application, will start building the automation annotations during the development of the application.

EXEMPLARY IMPLEMENTATION

Components
A Library will be provided with all annotation attributes defined.

An artificial intelligence (AI)-based core Engine which uses natural language processing will also be provided to read the code files which are checked in to source control. Depending on the code changes, the engine identifies if any of the annotations from the library exist on the code, and then uses a natural language processing mechanism to covert the annotations to create a feature file.

Flow
Step 1: Developers will add reference to the annotation library or install the nugget in the project.
Step 2: Once the annotation library is referenced, all annotations from the library are available for a developer to use during programming.
Step 3: During the code development, the developer will use the annotations for methods, classes, and variables. Just by way of example, Table 1 shows a class for an Agent controller, where the developer has added annotations for a Get Agent microservice.

TABLE 1

[Scenario("Get Agent Details")]
[Given("Agent GUID is {agentId}")]
[When("Agent ID is valid")]
[Then("the result should be {agentDetails}")]
///<summary>Get Agent Details
[HttpGet(HandlerApiRoutes.Agents.GetAgent)]
Public async Task<IActionResult> GetAgent([FromRoute]Guid agentId)
{
    var agent = await_agentRepositoryService.GetAgentAsync(agentId);
    if (agent == null)
    {
        Return NotFound( );
    }
    else
    {
        return OK(_mapper.Map<AgentDetailsResponse>(agent));
    }
}

Step 4: Once the code is ready, developer will check in the code to source control.
Step 5: In the continuous integration/continuous delivery (CI/CD) Pipeline, an additional build step will be included which will invoke Engine.

Step 6: The Engine will scan the code files which are part of the commit and read the annotations. Using the annotations and natural language processing, the Engine will generate a BDD file. Table 2 illustrates a feature in a BDD file.

TABLE 2

Feature: Agent Service APIs
Scenario: Get Agent Details
Given Agent GUID is {agentId}
When Agent ID is valid
Then the result should be {agentDetails}
Feature: Agent Service APIs Step 7: An additional step in Pipeline will pick the BDD file and import it to Ginger. The feature file will also include information like endpoint uniform resource locator (URL) (for application programming interface (API)), application URL for Website, and/or sample test data. Using Ginger AI Driven Automation capabilities, the BDD feature file will be converted to Automation Business flows.

Figure 4:
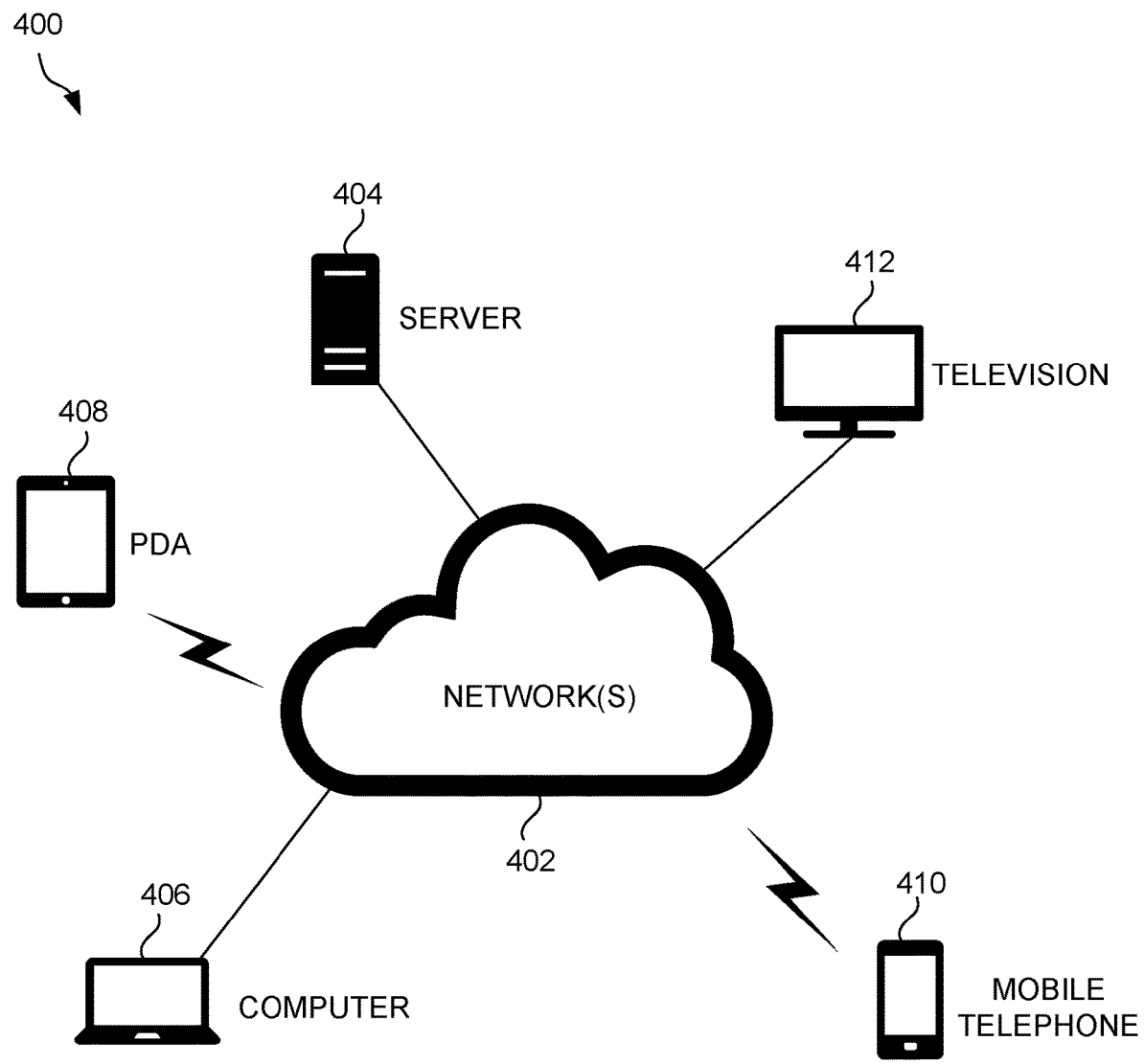
FIG. 4 illustrates a network architecture, in accordance with one possible embodiment.

BDD to Automation Conversion for APIs
1. New business flow will be created for each feature file
2. For API Endpoint, Ginger Auto pilot learning will learn the API and convert it to API Model
3. From the BDD file, for each line in the scenario, keywords/token will be generated
4. For each keyword/token, a corresponding API Model will be Identified using AI
5. Using a learned API model, a new Automation step will be created under the business flow BDD to Automation Conversion for Web
1. New business flow will be created for each feature file
2. For application URL, Ginger Auto pilot learning will learn the webpage and generate the Page object model
3. From the BDD file, for each line in the scenario, a token will be generated. E.g., If the BDD line is User Enters username, username is the token
4. For each token, a corresponding Project Object Model (POM) element will be Identified using AI
5. Using the POM element, a new Automation step will be added to the Business flow FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
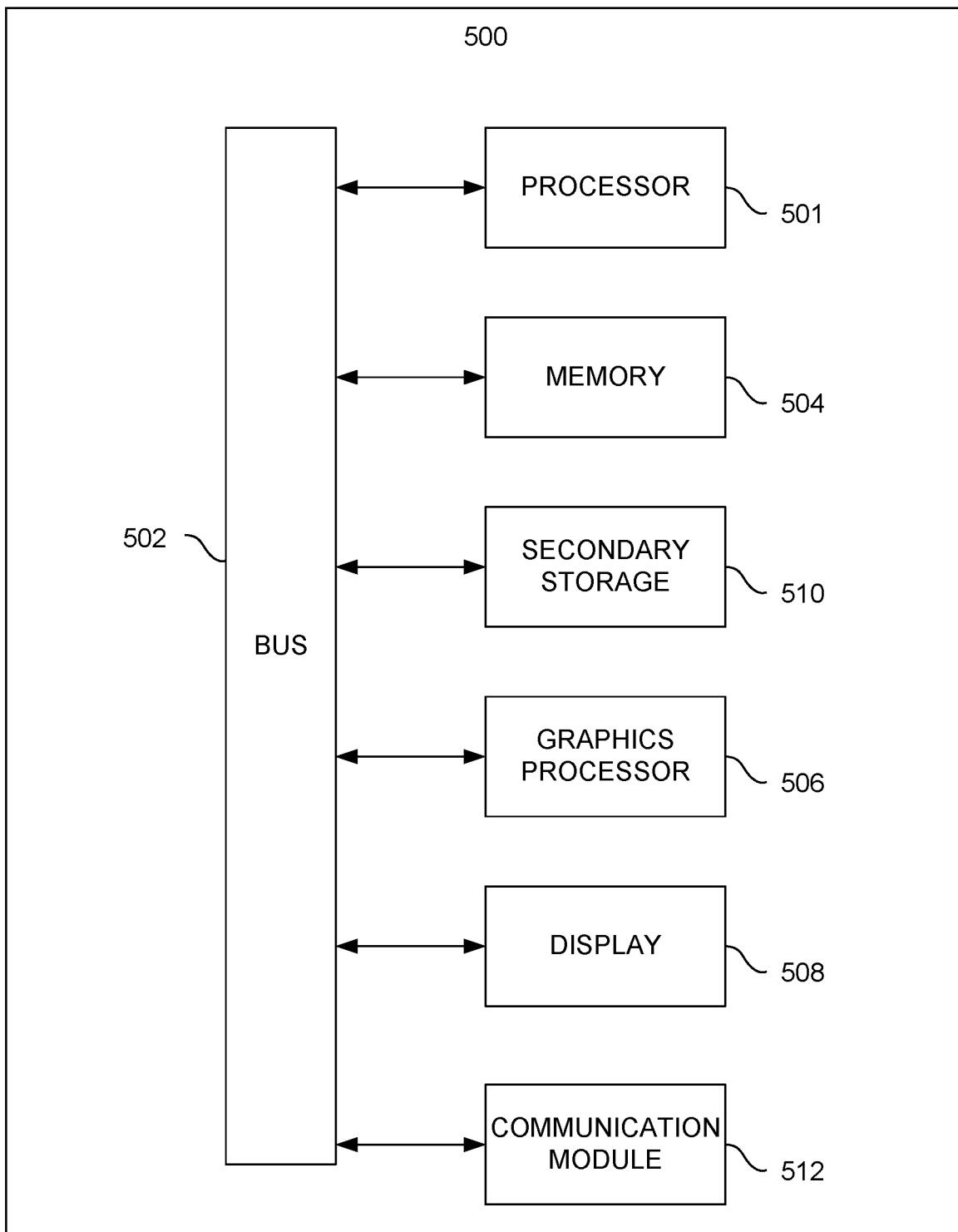
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   present a development interface for use by developers to develop code representing one or more features of an application,
   wherein the development interface connects with a library of predefined annotations describing potential features of the application and configured for use in generating test automations for the potential features,
   wherein the potential features include one or more of user interfaces, functions, libraries, or application programming interfaces (APIs);
   receive, via the development interface during development of the code representing the one or more features of the application, annotations tagged to the code representing the one or more features of the application, wherein the annotations are selected from the library of predefined annotations, and wherein the annotations tagged to the code representing the one or more features of the application form an annotated application;
   store the annotated application as a code file;
   responsive to a predetermined event, read, from the code file, the annotations tagged to the code representing the one or more features of the application;
   automatically process the annotations to generate a test automation for the application;
   execute the test automation to test the application for errors; and
   output a result of the test to the development interface.

2. The non-transitory computer-readable media of claim 1, wherein the development of the code representing the one or more features of the application includes development of an initial version of the application.

3. The non-transitory computer-readable media of claim 1, wherein the development of the code representing the one or more features of the application includes development of an update to an existing version of the application.

4. The non-transitory computer-readable media of claim 1, wherein the annotations are manually input by the developers of the application during the development of the code representing the one or more features of the application.

5. The non-transitory computer-readable media of claim 1, wherein the predetermined event includes the developers of the application submitting at least one developed portion of the application, wherein the at least one developed portion includes the annotations tagged to the code representing the one or more features of the application.

6. The non-transitory computer-readable media of claim 1, wherein the annotations are processed by:
creating a Behavioral Driven Development (BDD) feature file for the application, utilizing the annotations.

7. The non-transitory computer-readable media of claim 6, wherein the BDD feature file is created by applying natural language processing to the annotations.

8. The non-transitory computer-readable media of claim 6, wherein the test automation is generated from the BDD feature file.

9. The non-transitory computer-readable media of claim 1, wherein the annotations exist in code of the code file.

10. The non-transitory computer-readable media of claim 1, wherein the annotations are tagged to one or more of methods, classes, or variables defined in the code representing the one or more features of the application.

11. A method, comprising:
at a computer system:
presenting a development interface for use by developers to develop code representing one or more features of an application,
wherein the development interface connects with a library of predefined annotations describing potential features of the application and configured for use in generating test automations for the potential features,
wherein the potential features include one or more of user interfaces, functions, libraries, or application programming interfaces (APIs);
receiving, via the development interface during development of the code representing the one or more features of the application, annotations tagged to the code representing the one or more features of the application, wherein the annotations are selected from the library of predefined annotations, and wherein the annotations tagged to the code representing the one or more features of the application form an annotated application;
storing the annotated application as a code file;
responsive to a predetermined event, reading, from the code file, the annotations tagged to the code representing the one or more features of the application;
automatically processing the annotations to generate a test automation for the application;
executing the test automation to test the application for errors; and
outputting a result of the test to the development interface.

12. The method of claim 11, wherein the development of the code representing the one or more features of the application includes development of an initial version of the application.

13. The method of claim 11, wherein the development of the code representing the one or more features of the application includes development of an update to an existing version of the application.

14. The method of claim 11, wherein the annotations are manually input by the developers of the application during the development of the code representing the one or more features of the application.

15. The method of claim 11, wherein the annotations are processed by:
creating a Behavioral Driven Development (BDD) feature file for the application, utilizing the annotations.

16. The method of claim 15, wherein the BDD feature file is created by applying natural language processing to the annotations.

17. The method of claim 15, wherein the test automation is generated from the BDD feature file.

18. A system, comprising:
a non-transitory memory storing instructions; and
one or more processors in communication with the non-transitory memory that execute the instructions to:
present a development interface for use by developers to develop code representing one or more features of an application,
wherein the development interface connects with a library of predefined annotations describing potential features of the application and configured for use in generating test automations for the potential features,
wherein the potential features include one or more of user interfaces, functions, libraries, or application programming interfaces (APIs);
receive, via the development interface during development of the code representing the one or more features of the application, annotations tagged to the code representing the one or more features of the application, wherein the annotations are selected from the library of predefined annotations, and wherein the annotations tagged to the code representing the one or more features of the application form an annotated application;
store the annotated application as a code file;
responsive to a predetermined event, read, from the code file, the annotations tagged to the code representing the one or more features of the application;
automatically process the annotations to generate a test automation for the application;
execute the test automation to test the application for errors; and
output a result of the test to the development interface.

* * * * *